Oct. 22, 1963 E. F. WELLER, JR 3,108,194
QUANTIZER
Filed March 11, 1960
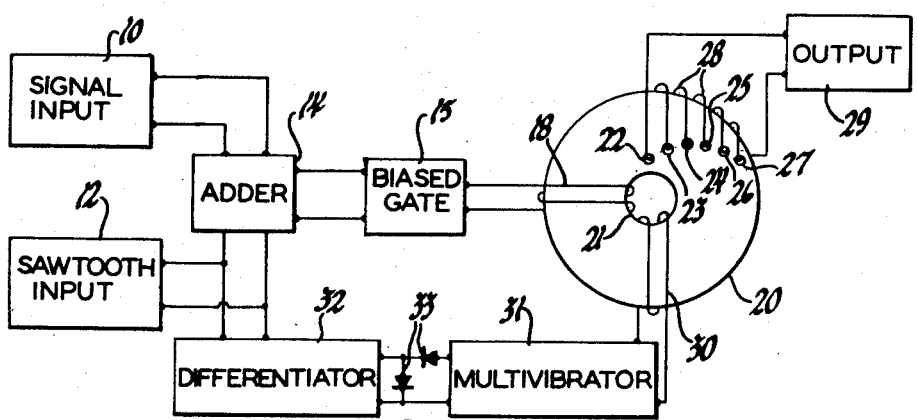
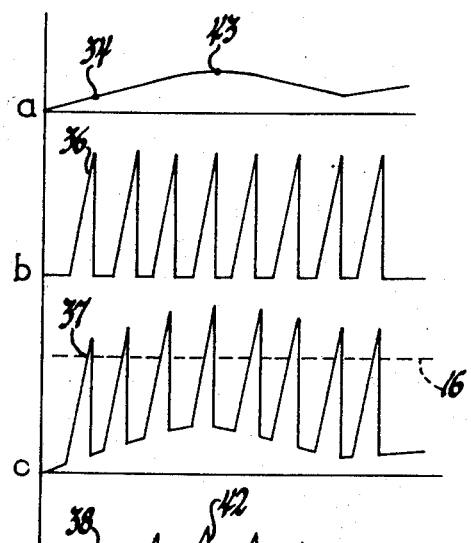
Fig.2
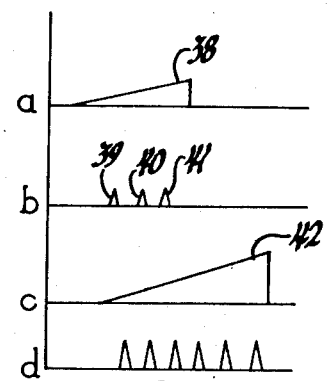
Fig.3
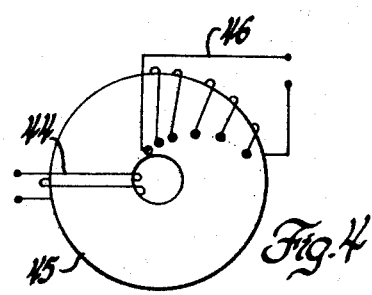
Fig.4
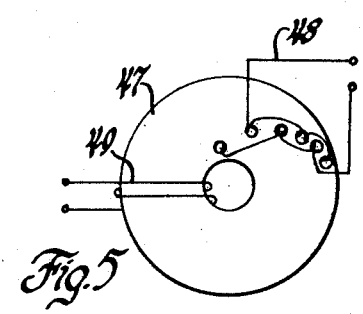
Fig.5
INVENTOR.
Edward F. Weller, Jr.
BY
Paul J. Ethington
ATTORNEY

United States Patent Office 3,108,194
Patented Oct. 22, 1963

3,108,194
QUANTIZER
Edward F. Weller, Jr., Birmingham, Mich., assignor to General Motors Corporation, Detroit, Mich., a corporation of Delaware
Filed Mar. 11, 1960, Ser. No. 14,372
3 Claims. (Cl. 307—88)

This invention relates to an analog-to-digital converter and more particularly to a magnetic core device adapted to produce a digital output in accordance with an analog input.

It is often necessary to convert a voltage level into a digital signal wherein the number of pulses in the signal is related to the magnitude of the voltage level. It is presently proposed to perform this operation by utilizing a magnetic core device which includes a plurality of definite flux paths of different length. In magnetic material having two stable remanent flux states and a substantially square hysteresis characteristic, there can be no appreciable change of flux except when the material is being switched from one to the other flux state. Thus, there can be no voltage induced in a winding linking a closed core of this material except during the period when the core is being switched from one remanent flux state to the other. If an input winding which links such a core is excited by an electrical input, the resulting flux will seek the shortest possible path around the core. When this path is saturated, the flux will shift to the next longest path. There will be an induced voltage in an output winding which links a given path of such a core only when the flux shifts into, switches the remanent flux state, and shifts out of this path.

It is the object of this invention to utilize a magnetic core device as an analog-to-digital converter. Another object is to provide a multiple aperture magnetic core device having a plurality of parallel flux paths having different lengths. A further object is to provide an analog-to-digital converter utilizing a magnetic core which includes a plurality of flux paths of differing length.

In accordance with this invention, a closed magnetic core is provided with an input winding which receives an input pulse that tends to produuce flux in the closed core in a first direction. If the core has been previously saturated in the opposite direction, the input pulse will tend to drive the core toward saturation in the first direction. A plurality of apertures in the core define a plurality of flux paths of different lengths. Since flux induced in the core will tend to seek the shortest flux path, the condition of saturation in the core will switch first in the path having the shortest length and then in alternate succession up to the path having the longest length. An output winding connected to link each of the plurality of paths individually will provide a pulse group output and the number of pulses in this group will be related to the magnitude of the input pulse. In other words, the number of output pulses will be related to the number of flux paths in which the input was effective to switch saturation.

The novel features which are believed to be characteristic of the invention are set forth with particularly in the appended claims. The invention itself, however, both as to its organization and method of operation, together with further objects and advantages thereof, may best be understood by reference to the following description, taken in conjunction with the accompanying drawing, in which:

FIGURE 1 is a block diagram of an electrical circuit incorporating the principal features of the invention;
FIGURES 2 and 3 are graphic representations of various waveforms appearing in the circuit of FIGURE 1; and
FIGURES 4 and 5 show modifications of the magnetic core of FIGURE 1.

With reference to FIGURE 1, there is shown a signal source 10 which is adapted to produce a direct voltage having a magnitude depending upon some condition. This source 10 could be responsive to an audio signal, to temperature, to mechanical displacement, or to any other relatively low frequency information. This voltage may vary with time according to the waveform shown in FIGURE 2(a). In order to periodically sample this input voltage and to produce a digital output in the form of a series of pulses related to the magnitude of the signal at the time of the sample, a sawtooth sampling waveform as shown in FIGURE 2(b) is added to the input signal. The output of the signal source 10 is combined with the output of a sawtooth voltage generator 12 by means of an adder circuit 14 which may be a resistance network or any conventional summing device. The output of the circuit 14 resembles the waveform shown in FIGURE 2(c) and is applied to a biased gate circuit 15 which is adapted to pass the input signals only if they exceed a predetermined bias or reference level 16. This level 16 would ordinarily be equal to the height of the sampling sawtooth pulses produced by the generator 12. The biased gate circuit 15 may be of any standard form such as an amplifier stage which is biased below cut-off by an amount equal to the voltage level 16. The output of the gate circuit 15 is a series of ramp or sawtooth pulses as shown in FIGURE 2(d) wherein the height of each pulse is directly proportional to the magnitude of the signal input of FIGURE 2(a) at the time of the occurrence of the corresponding sawtooth sampling pulse of FIGURE 2(b).

The output of the circuit 15 is applied to an input winding 18 of a ferrite core 20. The core 20 is of a flat annular construction and is composed of a ferrite material having two remanent flux states or a square hysteresis loop. The input winding 18 is threaded through a center hole 21 so that current in this winding tends to produce flux in the entire core 20. A plurality of small holes 22–27 are drilled or otherwise formed in the ferrite core 20. These holes 22–27 are positioned such that each hole is a different radial distance from the center of the core. The holes 22–27 could be positioned in a line along one radius of the core, but are shown in a spiral configuration which allows a maximum number of holes for a given sized core, permits accurate spacing of the holes, and does not unduly constrict the flux path at any one point. The distances between adjacent holes, or between one of the holes 22 or 27 and the edge of the core, are equal and of approximately the same magnitude as the thickness of the core 20. An output winding 28 is threaded through the holes 22–27 so that at least one turn passes through each hole. The output winding 28 is connected to output means 29 which may be an indicating or display device or a binary register.

Also threading the center hole 21 of the core 20 is a reset winding 30 which, when driven by a pulse of sufficient magnitude and time duration, is adapted to saturate the core in the direction opposite to that resulting from excitation of the input winding 18. The reset pulse is obtained from a one-shot multivibrator 31 which is triggered by the negative-going portion of the sawtooth sampling pulse. The output of the sawtooth generator 12 is coupled to a differentiator 32 and the positive-going spikes of the differentiated output are removed by a pair of diodes 33 so that only the negative spikes occurring at the end of each sampling pulse will trigger the multivibrator 31.

In the operation of the apparatus of FIGURE 1, the ferrite core 20 will be normally saturated in a counter-clockwise direction by the reset means. In other words, the core 20 will be in one of its remanent flux states due to the reset pulses that are applied to the reset winding 30. One of the reset pulses will occur after each sawtooth pulse appearing at the output of the sawtooth generator 12. If the signal source 10 produces a positive voltage such as the voltage level 34 shown in FIGURE 2(a), then a sawtooth sampling pulse 36 will be added to the level 34 by the circuit 14 so that the sum of the level 34 and the pulse 36 will exceed the bias level 16 as shown by the pulse 37 in FIGURE 2(c). A ramp function pulse 38 as shown in FIGURE 2(d), representing the amount by which the level 16 was exceeded, appears at the output of the circuit 15 and is applied to the input winding 18. This will tend to produce flux in the core 20 in a clockwise direction or opposite the direction that it is saturated by the reset pulses. The pulse 38 is shown in FIGURE 3(a) on an expanded time scale. Flux due to the pulse 38 will tend to seek the shortest path around the core 20 and initially the major portion of the flux will encircle the core in a narrow ring adjacent the center hole 21, including the area between the center hole 21 and the small hole 22. This region will saturate after a given amp-second interval and the major portion of the flux will shift radially and encircle the core in a region further from the center hole such as the circular path including the area between the small holes 22 and 23. The region between each of the adjacent pairs of holes defines a portion of a plurality of flux paths of differing length. Thus, as the region wherein the remanent flux state is being reversed shifts radially outward, there will be a condition of flux change in each of the plurality of paths in sequence. This change of flux is effective to generate a voltage in the output winding 28. Each section of the output winding 28 encircles one or more of the flux paths defined by the holes 22–27. As the region of flux change shifts into the area between the holes 22 and 23, then an output pulse 39 as shown in FIGURE 3(b) will be produced on the output winding 28. The waveform of FIGURE 3(b) is intended to illustrate the principle of operation rather than represent the actual wave shape.

The radial distance through which the input pulse 38 will be effective to switch the saturation condition will be dependent upon the magnitude of the pulse. For example, the pulse 38 of FIGURE 3(a) is shown to be effective to switch the saturation of the core past the three holes 22, 23, and 24 to generate three pulses 39, 40, and 41. A pulse 42 as shown in FIGURE 3(c), corresponding to a voltage level 43 of FIGURE 2(a), is shown to be effective to switch the region of change of saturation past all six of the holes 22–27 to produce six output pulses as shown in FIGURE 3(d).

The rate of radial shift of the region of flux change will decrease as the mean length of the flux path increases. Thus, a ramp waveform input is used to obtain proper time separation of the output pulses. If a rectangular waveform having constant amplitude and variable width is used, there will be time compression since the early part of the rectangular pulse will produce a greater number of output pulses per amp-second than the later part.

If the small holes are spaced as shown in FIGURE 4, that is, the distance between the holes increasing as the radial distance increases, then it is possible to produce an output pulse group wherein the number of pulses is a logarithmic function of the magnitude of the input signal. That is, if a ramp function is applied to an input winding 44 on a core 45 as illustrated in FIGURE 4, then the number of pulses appearing on an output winding 46 will be logarithmically related to the magnitude of the input ramp function. If the small holes are positioned such that the distance between the holes decreases as the radial distance increases as shown in a core 47 of FIGURE 5, then the number of pulses appearing on an output winding 48 will be a power function of the magnitude of the ramp function to a winding 49. FIGURE 5 further illustrates an alternate winding arrangement wherein the output winding 48 makes one turn around each separate flux path as defined by the areas between adjacent small holes. A sharper pulse output may be obtained by this arrangement on any of the cores described above.

While the invention has been described in terms of illustrative embodiments, it will of course be understood that the invention is not limited thereto since various modifications may be made, and it is contemplated that the appended claims will cover any such modifications as fall within the true scope of the invention.

I claim:

1. In apparatus for converting an electrical pulse into a series of pulses, an annular disc shaped magnetic core having a center hole and being composed of a ferrite material having two stable remanent flux states, a plurality of flux paths defined by a plurality of holes in said core, said plurality of holes defining a spiral configuration about said center hole, the spacing of said plurality of holes increasing as the radial distance from said center hole increases whereby said series of pulses will be related in number as a logarithmic function of the magnitude of said electrical pulse, an input winding linking said core means and connected to receive said electrical pulse, and an output winding linking each of said plurality of flux paths individually.

2. An apparatus for converting an electrical pulse into a series of pulses, an annular disc shaped magnetic core having a center hole and being composed of a ferrite material having two stable remanent flux states, a plurality of flux paths defined by a plurality of holes in said core, said plurality of holes defining a spiral configuration about said center hole, the spacing of said plurality of holes decreasing as the radial distance from said center hole increases whereby said series of pulses will be related in number as a power function of the magnitude of said electrical pulse, an input winding linking said core means and connected to receive said electrical pulse, and an output winding linking each of said plurality of flux paths individually.

3. Apparatus for periodically determining the magnitude of a relatively slowly varying signal quantity comprising; means for generating relatively rapidly occurring periodic sampling pulses of sloping waveform, combining means to receive said slowly varying signal quantity and said sampling pulses and to produce an output voltage corresponding to the sum thereof, a closed magnetic core having first and second remanent flux states, an input winding linking said core and connected to said combining means to receive said output voltage, current in said input winding tending to produce flux around said core in one direction, the magnitude of the current being related to the magnitude of said output voltage, a plurality of flux paths defined by a plurality of holes in said core and related in number to the numerical representation of the maximum magnitude of said slowly varying signal quantity to be determined, each of said flux paths differing in length from the remainder of said paths, an output winding connected to link each of the plurality of paths whereby a number of pulses is produced in said winding during each sampling pulse which number is a function of the magnitude of said slowly varying signal quantity, reset means connected to receive said sampling pulses and to produce a reset voltage after each of said pulses, and a reset winding linking said core and connected to receive said reset voltage thereby to switch the flux in said core opposite to said one direction after each sampling pulse.

References Cited in the file of this patent

UNITED STATES PATENTS

| 2,805,408 | Hamilton | Sept. 3, 1957 |
| 2,870,433 | Simpson | Jan. 20, 1959 |

OTHER REFERENCES

IBM Technical Disclosure Bulletins, page 33 of vol. 1, No. 2, August 1958; pages 19 and 20 of vol. 2, No. 2, August 1959.